United States Patent
Phillips

(10) Patent No.: US 8,231,502 B2
(45) Date of Patent: Jul. 31, 2012

(54) MULTI-SPEED TRANSMISSION HAVING THREE PLANETARY GEAR SETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 12/841,699

(22) Filed: Jul. 22, 2010

(65) Prior Publication Data

US 2011/0045935 A1 Feb. 24, 2011

Related U.S. Application Data

(60) Provisional application No. 61/236,413, filed on Aug. 24, 2009.

(51) Int. Cl.
*F16H 3/44* (2006.01)
*F16H 3/62* (2006.01)

(52) U.S. Cl. ......................................... 475/319; 475/275

(58) Field of Classification Search .................. 475/313, 475/319, 317, 311, 275
See application file for complete search history.

(56) References Cited

U.S. PATENT DOCUMENTS

| | | | | |
|---|---|---|---|---|
| 6,709,360 | B2* | 3/2004 | Raghavan et al. | 475/280 |
| 7,438,662 | B2* | 10/2008 | Chang et al. | 475/276 |
| 2004/0102277 | A1* | 5/2004 | Usoro et al. | 475/275 |
| 2006/0025275 | A1* | 2/2006 | Shim et al. | 475/276 |
| 2006/0035744 | A1* | 2/2006 | Seo et al. | 475/284 |
| 2007/0275813 | A1* | 11/2007 | Raghavan | 475/275 |
| 2008/0015083 | A1* | 1/2008 | Chang et al. | 475/286 |
| 2008/0020889 | A1* | 1/2008 | Jang et al. | 475/275 |
| 2009/0023537 | A1* | 1/2009 | Wittkopp et al. | 475/275 |
| 2010/0210398 | A1* | 8/2010 | Hart et al. | 475/275 |
| 2010/0210399 | A1* | 8/2010 | Wittkopp et al. | 475/275 |

* cited by examiner

*Primary Examiner* — Sherry Estremsky
*Assistant Examiner* — Lillian Nguyen

(57) ABSTRACT

A transmission is provided having an input member, an output member, a planetary gear set and a planetary gear set assembly, a plurality of coupling members and a plurality of torque transmitting devices. Each of the planetary gear sets includes first, second and third members. The torque transmitting devices include clutches and brakes.

12 Claims, 2 Drawing Sheets

| GEAR STATE | GEAR RATIO | RATIO STEP | TORQUE TRANSMITTING ELEMENTS ||||| 
|---|---|---|---|---|---|---|---|
| | | | 32 | 26 | 28 | 34 | 30 |
| REV | -3.984 | | X | G | | | |
| N | | -0.80 | O | | | | |
| 1ST | 5.003 | | X | | | G | |
| 2ND | 3.200 | 1.56 | X | | | X | |
| 3RD | 1.973 | 1.62 | | | X | X | |
| 4TH | 1.437 | 1.37 | | X | | X | |
| 5TH | 1.221 | 1.18 | | | | X | X |
| 6TH | 1.000 | 1.22 | | | X | | X |

X = ON - ENGAGED CARRYING TORQUE
O = ON - ENGAGED NOT CARRYING TORQUE
G = ON - GARAGE SHIFT ON AND CARRYING TORQUE

FIG. 3

MULTI-SPEED TRANSMISSION HAVING THREE PLANETARY GEAR SETS

CROSS-REFERENCE TO RELATED APPLICATIONS

This application claims priority to U.S. Provisional Application No. 61/236,413, filed on Aug. 24, 2009, which is hereby incorporated in its entirety herein by reference.

FIELD

The invention relates generally to a multiple speed transmission having a plurality of planetary gear sets and a plurality of torque transmitting devices and more particularly to a transmission having six or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, a planetary gear set and a planetary gear set assembly, an interconnecting member and a plurality of torque transmitting devices. The torque transmitting devices are for example clutches and brakes.

In another embodiment of the present invention, the transmission has an input member, an output member, a planetary gear set assembly having a first sun gear, a carrier member, a ring gear and a second sun gear member and a planetary gear set having a sun gear, a carrier member and a ring gear. Further, an interconnecting member continuously interconnects the carrier member of the planetary gear set assembly with the ring gear member of the planetary gear set.

In yet another embodiment of the present invention, the transmission includes a first torque transmitting mechanism that is selectively engageable to interconnect the second sun gear of the planetary gear set assembly with the sun gear member of the planetary gear set and the input member.

In yet another embodiment of the present invention, the transmission includes a second torque transmitting mechanism that is selectively engageable to interconnect the second sun gear of the planetary gear set assembly with the carrier member of the planetary gear set and the output member.

In yet another embodiment of the present invention, the transmission includes a third torque transmitting mechanism that is selectively engageable to interconnect the sun gear of the planetary gear set and the input member with the ring gear of the planetary gear set assembly.

In yet another embodiment of the present invention, the transmission includes a fourth torque transmitting mechanism that is selectively engageable to interconnect the ring gear of the planetary gear set assembly with the stationary member.

In yet another embodiment of the present invention, the transmission includes a fifth torque transmitting mechanism that is selectively engageable to interconnect the first sun gear of the planetary gear set assembly with the stationary member.

In yet another embodiment of the present invention, the torque transmitting mechanisms are selectively engageable in combinations of at least two to establish at least six forward speed ratios and at least one reverse speed ratio between the input member and the output member.

In still another embodiment of the present invention, the carrier member of the planetary gear set assembly rotatably supports a first plurality of planet gears and a second plurality of planet gears. The first plurality of planet gears intermesh with the first sun gear and the ring gear of the planetary gear set assembly and the second plurality of planet gears intermesh with the second sun gear of the planetary gear set assembly. Moreover, the first and second plurality of planet gears intermesh with each other.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the embodiments of the six speed automatic transmission of the present invention have an arrangement of permanent mechanical connections between the elements of the three planetary gear sets. A second component or element of a first planetary gear set is permanently coupled to a first component or element of the second planetary gear set. A third component or element of the first planetary gear set is permanently coupled to a second component or element of the second planetary gear set. A first component or element of the second planetary gear set and a second component or element of the first planetary gear set are permanently coupled to a first component or element of the third planetary gear set.

Figure 1:
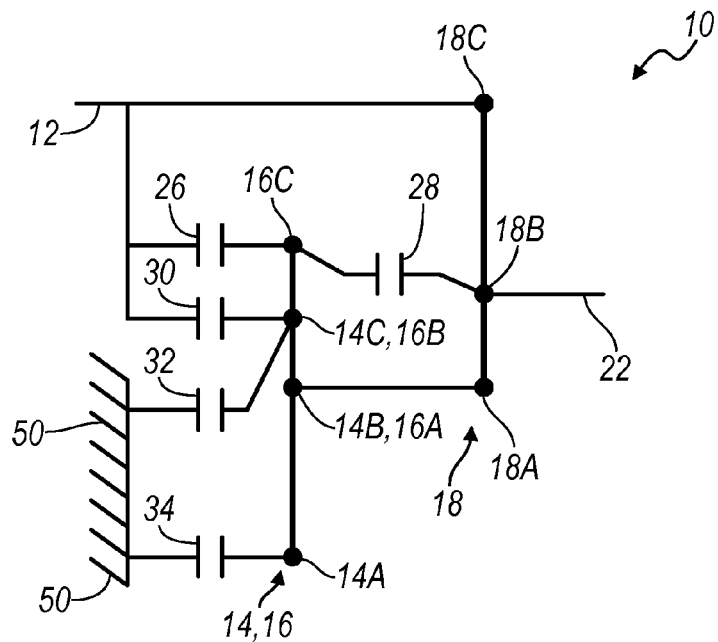
FIG. 1 is a lever diagram of an embodiment of a six speed transmission according to the present invention.

Referring now to FIG. 1, an embodiment of a six speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. In the lever diagram of FIG. 1, the levers for the first planetary gear set 14 and the second planetary gear set 16 have been combined into a single four node lever 14, 16 having: a first node 14A, a second node 14B, 16A, a third node 14C, 16B and a fourth node 16C. The third planetary gear set 18 has three nodes: a first node 18A, a second node 18B and a third node 18C.

The input member 12 is continuously coupled to the third node 18C of the third planetary gear set 18. The output member 22 is continuously coupled to the second node 18B of the third planetary gear set 18. The second node 14B of the first planetary gear set 14 is coupled to the first node 16A of the second planetary gear set 16 to form the single node 14B, 16A. The node 14B, 16A is coupled to the first node 18A of the third planetary gear set 18. The second node 16B of the second planetary gear set 16 is coupled to the third node 14C of the first planetary gear set 14 to form the single node 14C, 16B.

A first clutch 26 selectively connects the third node 16C of the second planetary gear set 16 and the input member or shaft 12 with the third node 18C of the third planetary gear set 18. A second clutch 28 selectively connects the third node 16C of the second planetary gear set 16 with the second node 18B of the third planetary gear set 18. A third clutch 30 selectively connects the third node 14C of the first planetary gear set 14 and the second node 16B of the second planetary gear set 16 (combined node 14C, 16B) with the input member or shaft 12 and the third node 18C of the third planetary gear set 18. A first brake 32 selectively connects the third node 14C of the first planetary gear set 14 and the second node 16B of the second planetary gear set 16 (combined node 14C, 16B) with a stationary member or transmission housing 50. A second brake 34 selectively connects the first node 14A of the first planetary gear set 14 with a stationary member or transmission housing 50.

Figure 2:
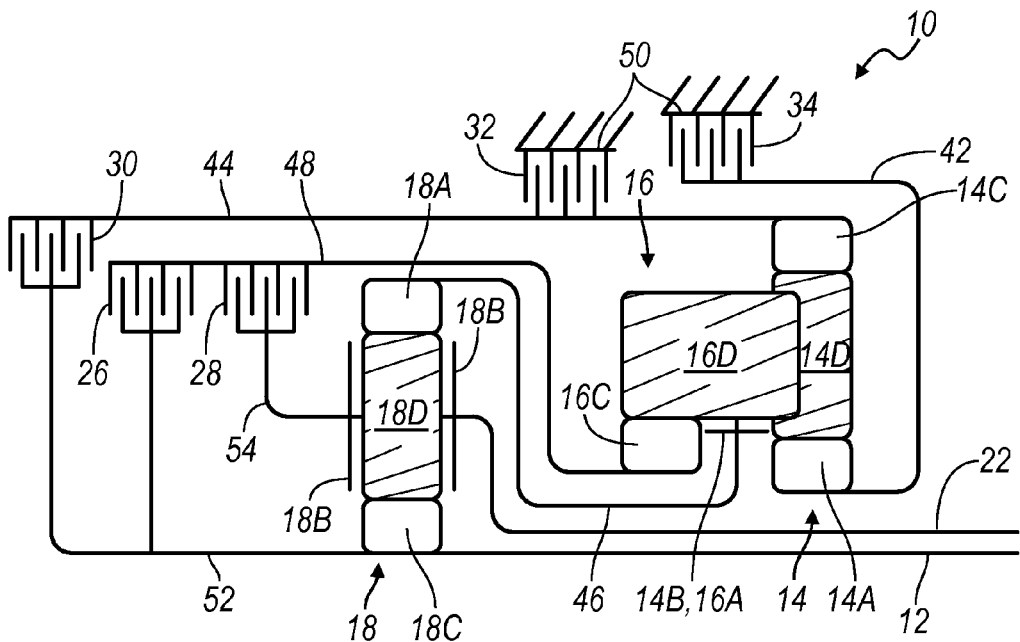
FIG. 2 is a diagrammatic illustration of an embodiment of a six speed transmission according to the present invention.

Referring now to FIG. 2, a stick diagram presents a schematic layout of the embodiment of the six speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B, 16A that rotatably supports a first set of planet gears 14D (only one of which is shown) and a second of planet gears 16D (only one of which is shown). The sun gear member 14A is connected for common rotation with a first shaft or interconnecting member 42. The ring gear member 14C is connected for common rotation with a second shaft or interconnecting member 44. The planet carrier member 14B, 16A is connected for common rotation with a third shaft or interconnecting member 46. The first set of planet gears 14D are each configured to intermesh with both the sun gear member 14A and the ring gear member 14C. The second set of planet gears 16D are each configured to intermesh with both the sun gear member 16C of the second planetary gear set 16 and the first set of planet gears 14D.

The planetary gear set 16 includes a sun gear member 16C and the planet gear carrier member 14B, 16A that rotatably supports the first set of planet gears 14D (only one of which is shown) and the second of planet gears 16D (only one of which is shown). As shown in FIG. 2, planetary gear set 14 and 16 share the same planet carrier member 14B, 16A. The sun gear member 16C is connected for common rotation with a fourth shaft or interconnecting member 48. The sun gear 14A or the ring gear 14C of planetary gear set 14 effectively acts as a third gear member (ring gear member) of planetary gear set 16. The planet carrier member 14B, 16A is connected for common rotation with the third shaft or interconnecting member 46. The first set of planet gears 16D are each configured to intermesh with both the sun gear member 16C and the second set of planet gears 14D. The second set of planet gears 14D are each configured to intermesh with both the sun gear member 14A and the ring gear member 14C and the first set of planet gears 16D.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a fifth shaft or interconnecting member 52 and with the input member or shaft 12. The ring gear member 18A is connected for common rotation with the third shaft or interconnecting member 46. The planet carrier member 18B is connected for common rotation with the sixth shaft or interconnecting member 54 and with output member or shaft 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32 and 34 allow for selective interconnection of the shafts or interconnecting members, members of the planetary gear sets and the housing. For example, the first clutch 26 is selectively engageable to connect the fifth shaft or interconnecting member 52 with the fourth shaft or interconnecting member 48. The second clutch 28 is selectively engageable to connect the sixth shaft or interconnecting member 54 with the fourth shaft or interconnecting member 48. The third clutch 30 is selectively engageable to connect the fifth shaft or interconnecting member 52 with the second shaft or interconnecting member 44. The first brake 32 is selectively engageable to connect the second shaft or interconnecting member 44 with the stationary element or the transmission housing 50 in order to restrict the member 44 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50.

Referring now to FIG. 2 and FIG. 3, the operation of the embodiment of the six speed transmission 10 will be described. It will be appreciated that transmission 10 is capable of transmitting torque from the input shaft or member 12 to the output shaft or member 22 in at least six forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26 and first brake 32 are engaged or activated. The first clutch 26 connects the fifth shaft or interconnecting member 52 with the fourth shaft or interconnecting member 48. The first brake 30 connects the second shaft or interconnecting member 44 with the stationary element or the transmission housing 50 in order to restrict the member 44 from rotating relative to the transmission housing 50. Likewise, the six forward ratios are achieved through different combinations of clutch and brake engagement, as shown in FIG. 3.

It will be appreciated that the foregoing explanation of operation and gear states of the six speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:
1. A transmission comprising:
an input member;
an output member;
a planetary gear set assembly having a first member, a second member, a third member and a fourth member;
a planetary gear set having a first, a second and a third member, wherein the third member of the planetary gear set is continuously connected to the input member;
an interconnecting member continuously interconnecting the second member of the planetary gear set assembly with the first member of the planetary gear set; and
at least five torque transmitting mechanisms selectively engageable to interconnect at least one of the first, second, third and fourth members of the planetary gear set assembly and at least one of the first, second and third members of the planetary gear set with another of first, second, third and fourth members of the planetary gear set assembly, another of the first, second and third members of the planetary gear set and a stationary member, wherein a first of the at least five torque transmitting mechanisms is selectively engageable to interconnect the fourth member of the planetary gear set assembly with the third member of the planetary gear set and the input member, and wherein a second of the at least five torque transmitting mechanisms is selectively engageable to interconnect the fourth member of the planetary gear set assembly with the second member of the planetary gear set and the output member, and
wherein the at least five torque transmitting mechanisms are selectively engageable in combinations of at least two to establish at least six forward speed ratios and at least one reverse speed ratio between the input member and the output member.

2. The transmission of claim 1 wherein a third of the at least five torque transmitting mechanisms is selectively engageable to interconnect the third member of the planetary gear set and the input member with the third member of the planetary gear set assembly.

3. The transmission of claim 2 wherein a fourth of the at least five torque transmitting mechanisms is selectively engageable to interconnect the third member of the planetary gear set assembly with the stationary member.

4. The transmission of claim 2 wherein a fifth of the at least five torque transmitting mechanisms is selectively engageable to interconnect the first member of the planetary gear set assembly with the stationary member.

5. The transmission of claim 1 wherein two of the at least five torque transmitting mechanisms are brakes for connecting at least one of the members of the planetary gear set and the planetary gear set assembly to the stationary member and three of the at least five torque transmitting mechanisms are clutches for connecting at least one other of the members of the planetary gear set and the planetary gear set assembly to at least one other member of the planetary gear set and the planetary gear set assembly.

6. The transmission of claim 1 wherein the first and the fourth members of the planetary gear set assembly are a first and a second sun gear and the third member of the planetary gear set is a sun gear, the second members of the planetary gear set and the planetary gear set assembly are carrier members and the third member of the planetary gear set assembly and the first member of the planetary gear set are ring gears.

7. The transmission of claim 6 wherein the carrier member of the planetary gear set assembly rotatably supports a first plurality of planet gears and a second plurality of planet gears, wherein the first plurality of planet gears intermesh with the second plurality of planet gears and with the first sun gear and the ring gear of the planetary gear set assembly and the second plurality of planet gears intermesh with the first plurality of planet gears and the second sun gear of the planetary gear set assembly.

8. A transmission comprising:
an input member;
an output member;
a planetary gear set assembly having a first member, a second member, a third member and a fourth member;
a planetary gear set having a first, a second and a third member;
an interconnecting member continuously interconnecting the second member of the planetary gear set assembly with the first member of the planetary gear set;
a first torque transmitting mechanism selectively engageable to interconnect the fourth member of the planetary gear set assembly with the third member of the planetary gear set and the input member;
a second torque transmitting mechanism selectively engageable to interconnect the fourth member of the planetary gear set assembly with the second member of the planetary gear set and the output member;
a third torque transmitting mechanism selectively engageable to interconnect the third member of the planetary gear set and the input member with the third member of the planetary gear set assembly;
a fourth torque transmitting mechanism selectively engageable to interconnect the third member of the planetary gear set assembly with the stationary member; and
a fifth torque transmitting mechanism selectively engageable to interconnect the first member of the planetary gear set assembly with the stationary member, and
wherein the torque transmitting mechanisms are selectively engageable in combinations of at least two to establish at least six forward speed ratios and at least one reverse speed ratio between the input member and the output member.

9. The transmission of claim 8 wherein the first and the fourth members of the planetary gear set assembly are a first and a second sun gear and the third member of the planetary gear set is a sun gear, the second members of the planetary gear set and the planetary gear set assembly are carrier members and the third member of the planetary gear set assembly and the first member of the planetary gear set are ring gears.

10. The transmission of claim 8 wherein the carrier member of the planetary gear set assembly rotatably supports a first plurality of planet gears and a second plurality of planet gears, wherein the first plurality of planet gears intermesh with the second plurality of planet gears, the first sun gear and the ring gear of the planetary gear set assembly and the second plurality of planet gears intermesh with the first plurality of planet gears and the second sun gear of the planetary gear set assembly.

11. A transmission comprising:
an input member;
an output member;
a planetary gear set assembly having a first sun gear, a carrier member, a ring gear and a second sun gear member;
a planetary gear set having a sun gear, a carrier member and a ring gear;
an interconnecting member continuously interconnecting the carrier member of the planetary gear set assembly with the ring gear member of the planetary gear set;
a first torque transmitting mechanism selectively engageable to interconnect the second sun gear of the planetary gear set assembly with the sun gear member of the planetary gear set and the input member;
a second torque transmitting mechanism selectively engageable to interconnect the second sun gear of the planetary gear set assembly with the carrier member of the planetary gear set and the output member;
a third torque transmitting mechanism selectively engageable to interconnect the sun gear of the planetary gear set and the input member with the ring gear of the planetary gear set assembly;
a fourth torque transmitting mechanism selectively engageable to interconnect the ring gear of the planetary gear set assembly with the stationary member; and
a fifth torque transmitting mechanism selectively engageable to interconnect the first sun gear of the planetary gear set assembly with the stationary member, and
wherein the torque transmitting mechanisms are selectively engageable in combinations of at least two to establish at least six forward speed ratios and at least one reverse speed ratio between the input member and the output member.

12. The transmission of claim 11 wherein the carrier member of the planetary gear set assembly rotatably supports a first plurality of planet gears and a second plurality of planet gears, wherein the first plurality of planet gears intermesh with the second plurality of planet gears, the first sun gear and the ring gear of the planetary gear set assembly and the second plurality of planet gears intermesh with the first plurality of planet gears and the second sun gear of the planetary gear set assembly.

* * * * *